INVENTORS
CORNELIS G. MIDDELBEEK
WILLEM J. DE JONGE

BY *Stevens, Davis, Miller & Mosher*

ATTORNEYS

United States Patent Office 3,529,728
Patented Sept. 22, 1970

3,529,728
OIL SEPARATING DEVICE
Cornelis Gerardus Middelbeek, Nootdorp, and Willem Johannes de Jonge, The Hague, Netherlands, assignors to Frederic R. Harris (Holland) N.V., The Hague, Netherlands
Filed Feb. 3, 1969, Ser. No. 796,102
Claims priority, application Netherlands, Feb. 5, 1968, 6801614
Int. Cl. B01d 21/10
U.S. Cl. 210—522          7 Claims

ABSTRACT OF THE DISCLOSURE

This invention relates to a device which is useful in separating an oil fraction from a mixture of oil and a liquid heavier than the oil comprising a basin divided into three successive stages through which the mixture is passed; the first stage receiving and filtering the mixture to be separated, the second stage containing upwardly inclined multiple flow channels spaced vertically from each other with a plurality of tapered fingers at the upper ends thereof, which channels and fingers act to separate the heavy from the light fractions; and the third stage containing a skimmer with which the oil fraction is removed and a baffled exit which the heavy liquid fraction passes.

In the oil separating art, several devices have previously been used to remove the lighter oil fraction by flow. In these the inclined walls are usually formed by corrugated sheets and the oil laden liquid is flowed downwardly from the upper ends thereof. This necessarily dictates that the corrugated sheets be of great length for a sufficient separation because the oil fraction is discharged upwardly against the downwardly flowing liquid and consequently a portion thereof is intermingled with and carried away by the liquid again.

It is an object of this invention to provide a separating device giving a better separation with a shorter length. To this end the channels through which the oil laden liquid passes are provided at their upper extremities with tapering fingers having openings therebetween, the inlet of the separating device being provided at the lower extremities of the channels.

By this it is possible to direct the oil by means of the upwardly directed flow to a conveying trough, and being upwardly directed, no increase in the velocity of the flow takes place at the discharge end of the oil separator.

Preferably there is an angle in the vertical plane between each finger and its adjacent fingers. By this the velocity of the flow is slowed in the upper portion of the oil separator, substantially shortening the path of separation.

According to a further feature of the invention, said separated flow paths are further subdivided transversely by means of partitions, in this way obtaining a better flow pattern of the liquid through the oil separator with a substantially uniform overall velocity of the flow. This also stimulates separation.

Figure 1:
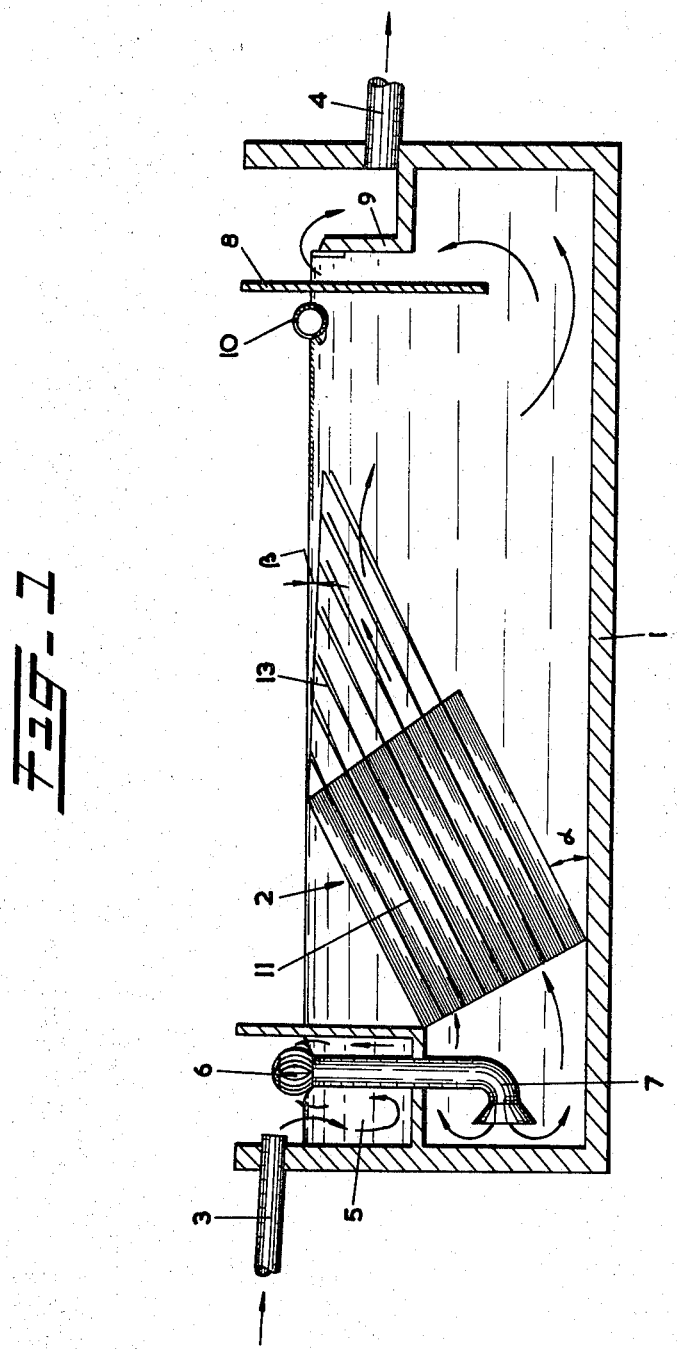
FIG. 1 is a longitudinal section of the oil separating device.

The oil separating device of FIG. 1 comprises a basin 1 with an oil separator 2, said bain 1 being provided with a supply 3 for the oil laden liquid and a discharge 4 for the heavy liquid fraction.

The oil laden liquid flows through the supply 3 into a space 5 containing a filter 6 for removing solid entrained particles and then flows through line 7 to the oil separator 2.

After having passed through the oil separator 2, the heavy liquid fraction flows under partition 8 and over an overflow 9 to the discharge 4.

The oil separated in the oil separator 2, having a lower specific weight than the heavy liquid, then floats on this liquid and is adapted to be discharged, preferably by means of an adjustable skimmer 10.

The oil separator 2 comprises parallel vertically spaced plates 11 forming an angle $\alpha$ with the horizontal plane. These plates 11 provide separate flow paths above each other having a vertical rise which is lower than the overall height of the separator 2. Consequently the oil particles have to ascend a shorter distance than in a conventional open separator. Because several vertically displaced flow paths are presented by this arrangement, a coarse separation of the oil and liquid fractions will initially take place at the entrance to separator 2 due to the preponderance of the heavier fraction in the lower level of the mixture, and of the lighter fraction near the surface of the mixture.

The arrangement of the separator 2 at an angle has the advantage that the upwardly directed flow leads the oil particles to the skimmer 10. Consequently the separation takes place in the direction of the flow of the liquid-oil mixture, substantially shortening the separation time and the length of the device because hardly any mixing caused by turbulence at the liquid-oil interface will occur.

The angle $\alpha$ is chosen in relation to what is required to be separated and the desired dimensions of the basin 1. This angle is between 30° and 45°.

Figure 2:
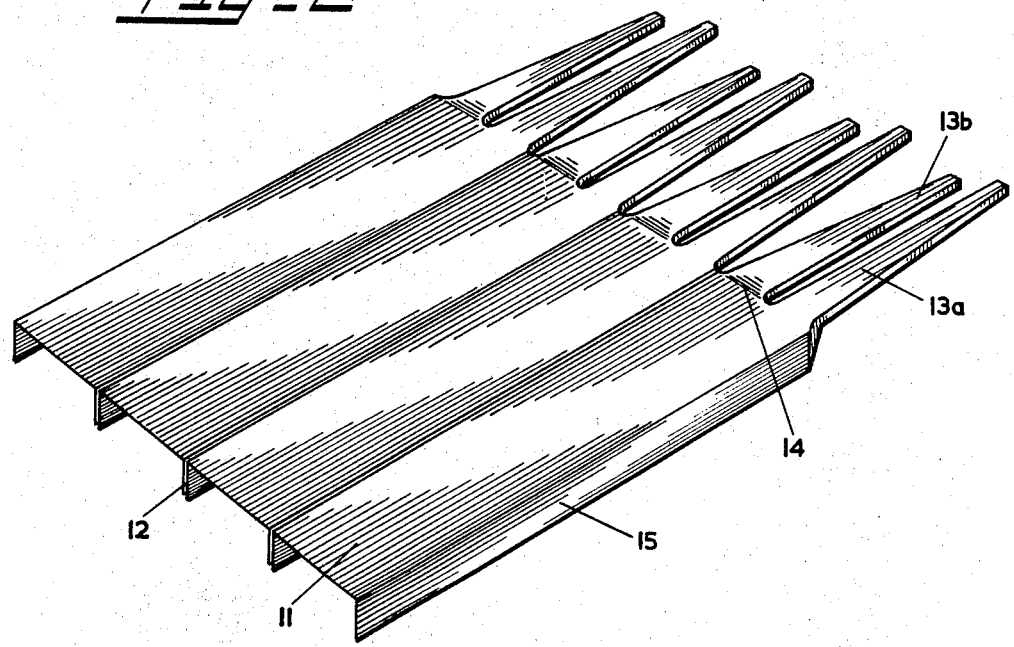
FIG. 2 shows a row of side by side placed reversed U-shaped channels with fingers.
Figure 3A:
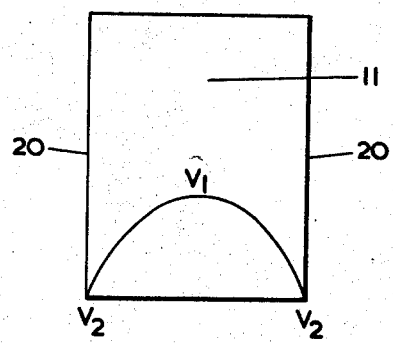
FIG. 3a shows the velocity pattern in a channel without partitions.
Figure 3B:
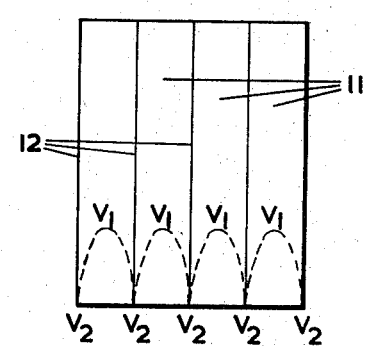
FIG. 3b shows the velocity pattern in a channel with partitions.

As is commonly known in the fluid flow art, the velocity of a fluid stream in laminar flow varies in a parabolic manner from a minimum at the side walls of the conduit or channel to a maximum at the center due to drag forces exerted between the aforesaid sidewalls and the particles forming the stream. Thus, if plate 11 were to have only walls 20 at each side, as shown in FIG. 3a, a large variation between the maximum velocity $V_1$ of the oil laden liquid at the center of channel 11 and the minimum velocity $V_2$ at the sides 20 would occur. Because a more uniform overall velocity is preferable in the practice of this invention, partitions 12 are used to laterally divide the flow paths as shown in FIG. 2 and FIG. 3b, forming channels 15 in order to obtain the more uniform relationship between maximum velocity $V_1$ and minimum velocity $V_2$ over the entire face of plate 11 shown in FIG. 3b.

Due to the above-mentioned arrangement, oil separator 2 comprises a number of rows located one above the other of reversed U-shaped channels 15 placed side by side; the legs of the U forming in each row the partitions 12 and the connections of the legs in each row formed by the plates 11. The rows may be connected with each other in a simple way to form flow paths separated in the vertical direction by providing the partitions at their free ends with bent portions, not shown, or by applying connecting brackets thereto.

Because the inlet opening at the under side of the oil separator 2 has to be equal to the outlet opening at its upper side and in addition because the oil separated from the heavy liquid in the channels 15 has to be guided substantially up to the liquid surface to avoid intermixing of the heavy liquid fraction with the separated oil, the channels are provided at the upper side with fingers 13 which lead the oil to the liquid surface, there being an opening between the fingers to make it possible for the heavier liquid fraction to flow on without increasing the flow speed.

By giving each finger 13 an angle with the vertical other than that of the adjacent fingers it is even possible to decrease the flow speed in the upper portion of the oil separator; in this way promoting the oil separation.

As shown in FIG. 2 for example, the upper face of finger 13a lies in the same plane as the plate 11 of the channel 15 and the finger 13b is bent downwardly about line 14.

The fingers 13 lead the oil to the liquid surface. They can also be formed to this end as a reversed U.

Referring to FIG. 1, it can be seen that since fingers 13 are used to guide the lighter oil fraction to the surface, the thickness of the oil layer will vary from a minimum at the point where the fingers of the uppermost layer of channels to a maximum where the fingers of the lowermost layer of channels terminate. Therefore, in order to avoid the possibility of mixing the fraction of heavy liquid separated from the oil in the lowermost channels with oil floating on the surface, fingers 13 terminate at a point defined by angle $\beta$ measured from the point where the uppermost corner of separator unit 2 meets the surface of the liquid. This angle can vary from 4° to 20° dependent among others upon the angle $\alpha$, with a greater angle $\beta$ as $\alpha$ increases.

In addition, since the length of the lowermost fingers is thus designed to be greater than that of the uppermost fingers, the heavier oil particles generally present in the lower level at the inlet of the separator must flow over a longer path, which obviously is the best separation length therefor.

The advantages of a separation device constructed according to the invention are:

(1) Because fingers 13 lead the oil substantially to the liquid surface, separation in the flow direction of the oil laden liquid is possible.

(2) By giving each finger an angle relative to the adjacent finger the discharge speed from the separator 2 is decreased, promoting the separation.

(3) By making the separation path of the heavier oil particles long and of the lighter particles short, the best length for separation is available for each oil particle.

(4) By the lateral division of the flow path by means of partitions 12, a better flow pattern without large peaks is obtained.

What is claimed is:

1. A device for separating oil from an oil laden liquid in which the liquid is heavier than the oil, comprising a plurality of parallel separate inclined plates spaced vertically from each other, a plurality of tapering fingers located at the upper ends of said inclined plates, inlet means for said oil laden liquid at the lower end of said plurality of inclined plates so that said oil laden liquid is forced to flow upwardly in order to separate the oil from the liquid, reservoir means positioned at the upper end of said plurality of inclined plates so that the oil separated from the liquid is carried by said plurality of fingers to, and is allowed to lie as a layer on, the surface of the liquid without substantially intermixing therewith, outlet means in said reservoir means for the discharge of said separated oil, and outlet means in said reservoir for the discharge of said liquid.

2. A device according to claim 1 in which there is an angle in the vertical plane between adjacent fingers.

3. A device according to claim 1 in which the angle of inclination of the plates with the horizontal plane varies from 30° to 45° and the angle of inclination with the horizontal of the plane passing through the extremities of the upper fingers of the plates varies from 4° to 20°.

4. A device according to claim 1 in which the plates are laterally further subdivided by means of partitions.

5. A device according to claim 4 in which a plurality of U-shaped channels are connected together to form said laterally subdivided plate, the legs of the U forming the partitions.

6. A device according to claim 5 in which each channel has attached at one end thereof at least two tapered fingers of U-shaped cross section.

7. A device according to claim 6 in which the legs of said U-shaped members depend downwardly from the connecting portions thereof, the legs of the channels being connected to the plate below in order to form horizontal partitions thereon.

References Cited

UNITED STATES PATENTS

| 3,182,799 | 5/1965 | Krofta | 210—521 X |
| 3,346,122 | 10/1967 | Cornelissen | 210—540 X |
| 3,399,135 | 8/1968 | Conley et al. | 210—521 X |

JOHN W. ADEE, Primary Examiner

U.S. Cl. X.R.

210—540